(12) United States Patent
Chen et al.

(10) Patent No.: US 11,415,844 B2
(45) Date of Patent: Aug. 16, 2022

(54) LIQUID CRYSTAL DISPLAY

(71) Applicant: HIMAX TECHNOLOGIES LIMITED, Tainan (TW)

(72) Inventors: Po-Nan Chen, Tainan (TW); Ya-Jing Yang, Tainan (TW); Yu-Jui Hsieh, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 366 days.

(21) Appl. No.: 16/540,066

(22) Filed: Aug. 14, 2019

(65) Prior Publication Data

US 2021/0048701 A1    Feb. 18, 2021

(51) Int. Cl.
| | | |
|---|---|---|
| *G02F 1/1345* | (2006.01) | |
| *G02F 1/1362* | (2006.01) | |
| *G02F 1/1337* | (2006.01) | |

(52) U.S. Cl.
CPC ........ *G02F 1/13454* (2013.01); *G02F 1/1337* (2013.01); *G02F 1/136277* (2013.01)

(58) Field of Classification Search
CPC . G02F 1/13452; G02F 1/13458; G02F 1/1345
See application file for complete search history.

(56) References Cited

U.S. PATENT DOCUMENTS

| | | | |
|---|---|---|---|
| 6,246,458 B1 | 6/2001 | Koma et al. | |
| 6,521,475 B1* | 2/2003 | Chen | G02F 1/133553 349/139 |
| 2003/0164919 A1* | 9/2003 | Oh | G02F 1/13458 349/149 |
| 2009/0251446 A1* | 10/2009 | Ogawa | G02F 1/13452 345/204 |
| 2011/0183451 A1* | 7/2011 | Tanaka | G02F 1/133512 438/30 |
| 2016/0202812 A1* | 7/2016 | Pyoun | G06F 3/0443 345/173 |
| 2017/0059915 A1* | 3/2017 | Kobayashi | G02F 1/13394 |
| 2020/0174327 A1* | 6/2020 | Song | G02F 1/136227 |
| 2020/0278587 A1* | 9/2020 | Fukami | G02F 1/136286 |

FOREIGN PATENT DOCUMENTS

| | | |
|---|---|---|
| TW | I489184 | 6/2015 |
| TW | I527258 | 3/2016 |
| TW | 201831963 | 9/2018 |

OTHER PUBLICATIONS

"Office Action of Taiwan Counterpart Application", dated Jun. 15, 2020, pp. 1-4.

* cited by examiner

*Primary Examiner* — Alexander P Gross
(74) *Attorney, Agent, or Firm* — JCIPRNET

(57) ABSTRACT

A liquid crystal display includes a first substrate, a pixel array, a first pad, a dielectric layer, a filling pattern, a first conductor, a second substrate and a liquid crystal layer. The first substrate has a display area and a pad area located outside the display area. The pixel array is disposed on the display area. The first pad is disposed on the pad area. The dielectric layer has a first opening overlapped with the first pad. The filling pattern is disposed within the first opening of the dielectric layer. The filling pattern has through holes, and the through holes of the filling pattern are overlapped with the first pads. The first conductor is disposed in the first opening of the dielectric layer, and is electrically connected to the first pad via the through holes of the filling pattern.

9 Claims, 10 Drawing Sheets

LIQUID CRYSTAL DISPLAY

TECHNICAL FIELD

The invention relates to a display, and more particularly, to a liquid crystal display.

BACKGROUND

A liquid crystal on silicon (LCOS) display is a liquid crystal display that uses a semiconductor process to fabricate a pixel array, a driver integrated circuit, and other electronic components on a silicon chip. In addition to technical advantages of small pixel size and high resolution, the LCOS display also has the advantages of simple process, low cost and small volume. Therefore, the LCOS display has been widely used in various electronic products, such as portable cameras, projectors and the like.

In a manufacturing process of the LCOS display, an alignment film needs to be formed on the silicon chip. However, a surface of the silicon chip is mostly uneven. When the alignment film is formed on the uneven surface, a striation defect is likely to occur.

SUMMARY

The invention provides a liquid crystal display with excellent performance.

A liquid crystal display of the invention includes a first substrate, a pixel array, a first pad, a dielectric layer, a filling pattern, a first conductor, a second substrate and a liquid crystal layer. The first substrate has a display area and a pad area located outside the display area. The pixel array is disposed on the display area of the first substrate. The first pad is disposed on the pad area of the first substrate. The dielectric layer is disposed on the pad area of the first substrate, and has a first opening. The first opening of the dielectric layer is overlapped with the first pad. The filling pattern is disposed within the first opening of the dielectric layer. The filling pattern has through holes, and the through holes of the filling pattern are overlapped with the first pads. The first conductor is disposed in the first opening of the dielectric layer, and is electrically connected to the first pad via the through holes of the filling pattern. The second substrate is disposed opposite to the first substrate. The liquid crystal layer is disposed between the pixel array and the second substrate.

In an embodiment of the invention, a material of the filling pattern includes a photoresist.

In an embodiment of the invention, the liquid crystal display further includes an alignment film, which is located between the first conductor and the filling pattern.

In an embodiment of the invention, the first pad is electrically connected to the second substrate via the first conductor.

In an embodiment of the invention, the liquid crystal display further includes a solder wire and a circuit board. The solder wire is disposed on the first conductor and electrically connected to the first conductor. The circuit board is electrically connected to the first pad via the solder wire and the first conductor.

In an embodiment of the invention, one of the through holes of the filling pattern has an aperture D, and 0.3 µm≤D≤10 µm.

In an embodiment of the invention, the first substrate is a silicon substrate.

In an embodiment of the invention, a material of the first conductor includes Ni.

In an embodiment of the invention, the dielectric layer has a second opening spaced apart from the first opening. The liquid crystal display further includes a second pad and a second conductor. The second pad is disposed on the pad area of the first substrate, and spaced apart from the first pad. The second opening of the dielectric layer is overlapped with the second pad. The second conductor is disposed in the second opening of the dielectric layer. The second pad has a surface overlapped with the second opening of the dielectric layer, and the second conductor directly contacts and completely covers the surface of the second pad.

In an embodiment of the invention, an area of the second pad is smaller than an area of the first pad.

To make the aforementioned more comprehensible, several embodiments accompanied with drawings are described in detail as follows.

DETAILED DESCRIPTION

Figure 1:
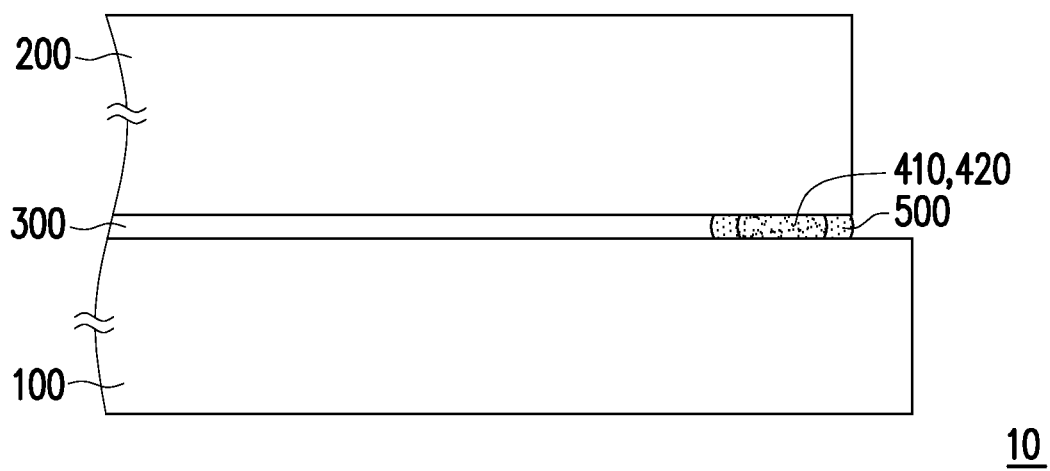
FIG. 1 is a cross-sectional view of a liquid crystal display 10 in an embodiment of the invention.

FIG. 1 is a cross-sectional view of the liquid crystal display 10 in an embodiment of the invention.

Figure 2:
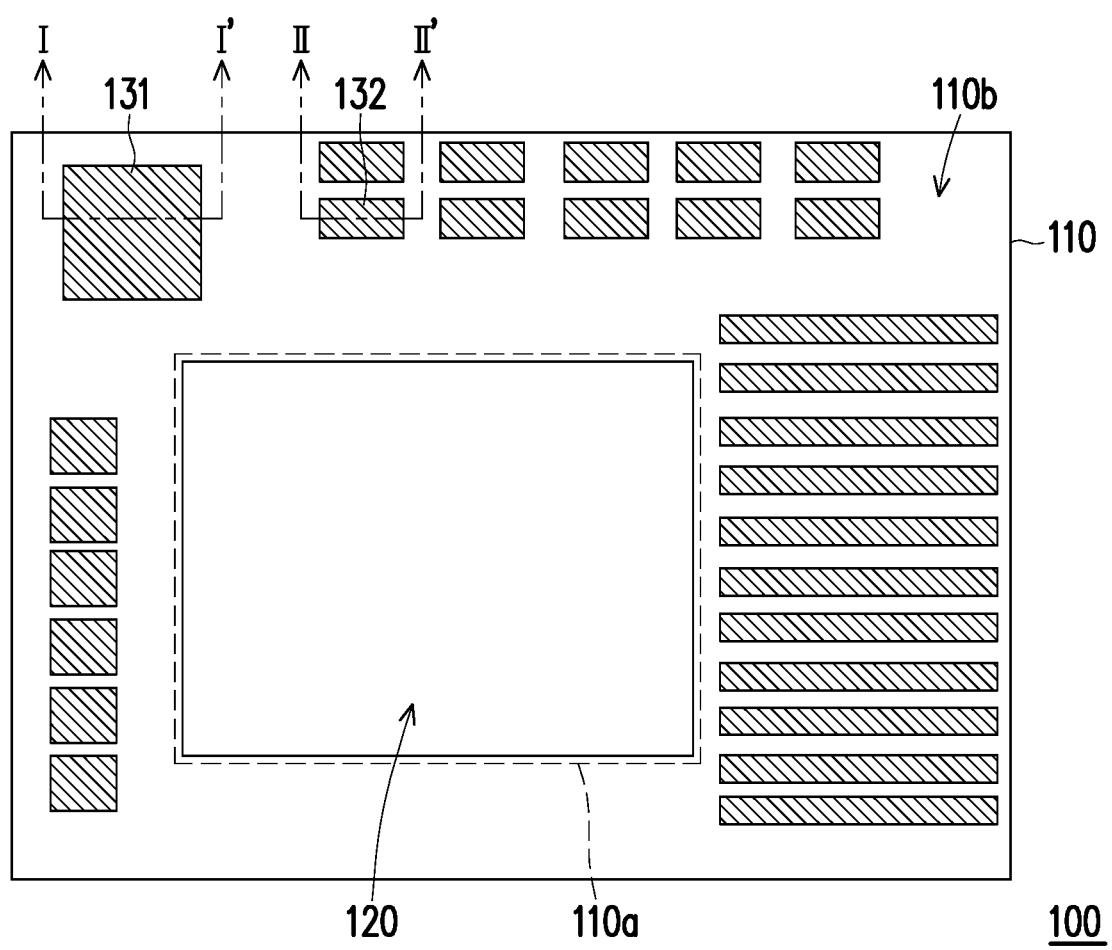
FIG. 2 is a top view of a pixel array substrate 100 of FIG. 1.

FIG. 2 is a top view of the pixel array substrate 100 of FIG. 1.

FIG. 3A to FIG. 3E are cross-sectional views showing a manufacturing process of the liquid crystal display device 10 according to an embodiment of the invention. FIG. 3A to FIG. 3E correspond to the section line I-I' and the section line II-II' of FIG. 2.

The manufacturing process of the liquid crystal display device 10 and a structure thereof in an embodiment of the invention will be described with reference to FIG. 1, FIG. 2, and FIG. 3A to FIG. 3E.

Figure 3A:
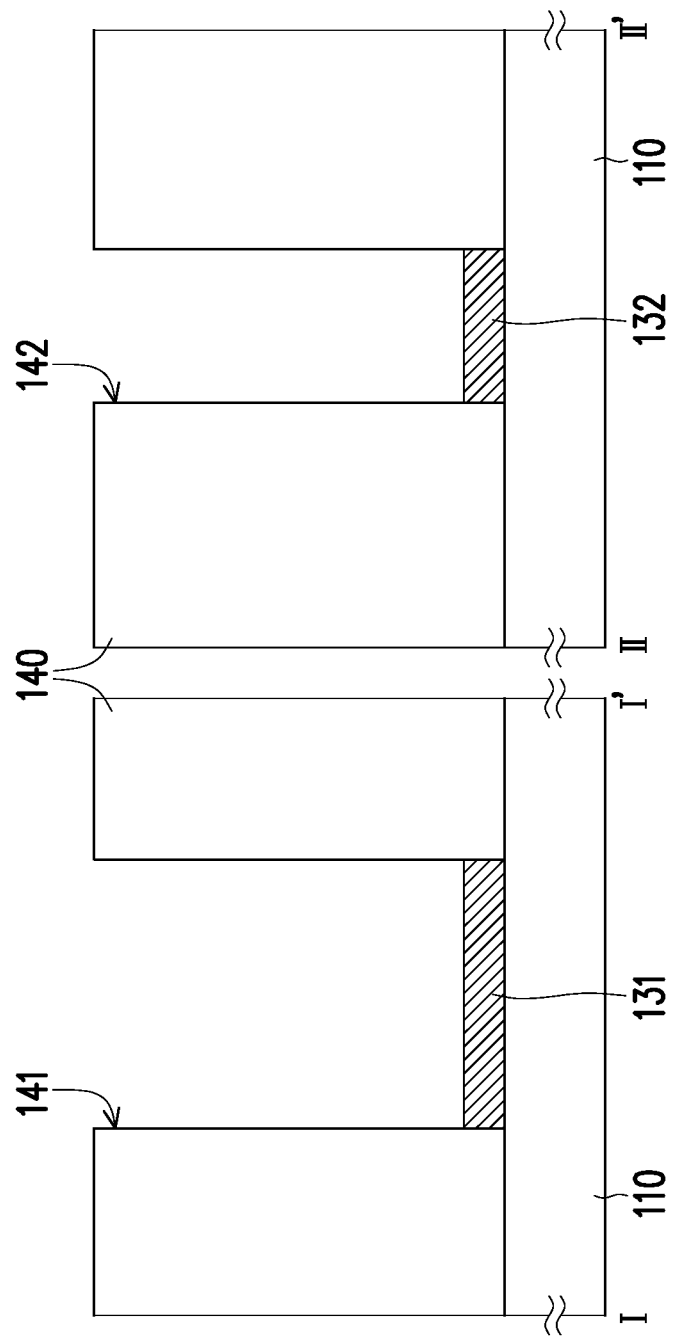
FIG. 3A to FIG. 3E are cross-sectional views showing a manufacturing process of the liquid crystal display device 10 according to an embodiment of the invention.

Referring to FIG. 1, FIG. 2 and FIG. 3A, first of all, the pixel array substrate 100 is provided. The pixel array substrate 100 includes a first substrate 110, a pixel array 120 and a plurality of pads 131 and 132. The first substrate 110 has a display area 110a and a pad area 110b located outside the display area 110a. The pixel array 120 is disposed on the display area 110a of the first substrate 110. The pads 131 and 132 are disposed on the pad area 110b of the first substrate 110. In this embodiment, the pads 131 and 132 may be electrically connected to the pixel array 120 located in the display area 110a and/or other components of the pixel array substrate 100, but the invention is not limited thereto.

For instance, in this embodiment, the first substrate 110 may be a silicon substrate; the pixel array 120 includes a plurality of pixels; and each of the pixels may include a transistor formed on the silicon substrate and a reflective electrode electrically connected to the transistor. In short, in this embodiment, the pixel array substrate 100 may be a silicon chip of a reflective liquid crystal on silicon panel, but the invention is not limited thereto.

The pixel array substrate 100 further includes a dielectric layer 140. The dielectric layer 140 is at least disposed on the pad area 110b of the first substrate 110, and has a plurality of openings 141 and 142. The openings 141 and 142 of the dielectric layer 140 are overlapped with the pads 131 and 132, respectively.

For instance, in this embodiment, a material of the dielectric layer 140 may be an inorganic material (e.g., a silicon oxide, a silicon nitride, a silicon oxynitride, or a stacked layer of at least two of the above materials), an organic material or a combination of the above; a material of the pads 131 and 132 may be a metal or other conducting material.

Figure 3B:
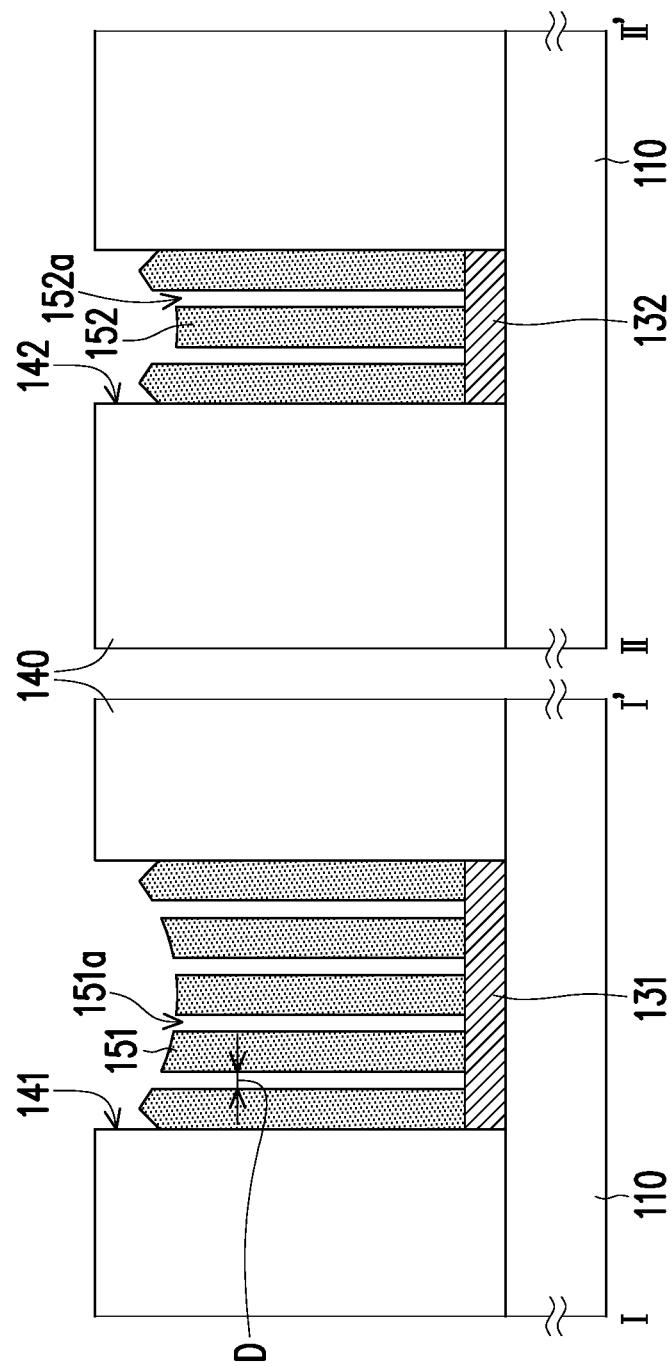

Referring to FIG. 1, FIG. 2 and FIG. 3B, next, a plurality of filling patterns 151 and 152 are formed on the first substrate 110. The filling patterns 151 and 152 are disposed within the openings 141 and 142 of the dielectric layer 140, respectively. In particular, the filling pattern 151 has a plurality of through holes 151a, and the through holes 151a of the filling pattern 151 are overlapped with the pad 131; the filling pattern 152 has a plurality of through holes 152a, and the through holes 152a of the filling pattern 152 are overlapped with the pad 132.

For instance, in this embodiment, a full-surface photoresist material layer (not shown) may be formed on the dielectric layer 140 and the pads 131 and 132; subsequently, a patterning process is performed on the photoresist material layer to form the filling patterns 151 and 152. In this embodiment, a material of the filling patterns 151 and 152 may include a photoresist, but the invention is not limited thereto.

Further, in this embodiment, each of the through holes 151a and 152a of the filling patterns 151 and 152 has an aperture D, and 0.3 µm≤D≤10 µm. However, the invention is not limited in this regard.

Figure 3C:
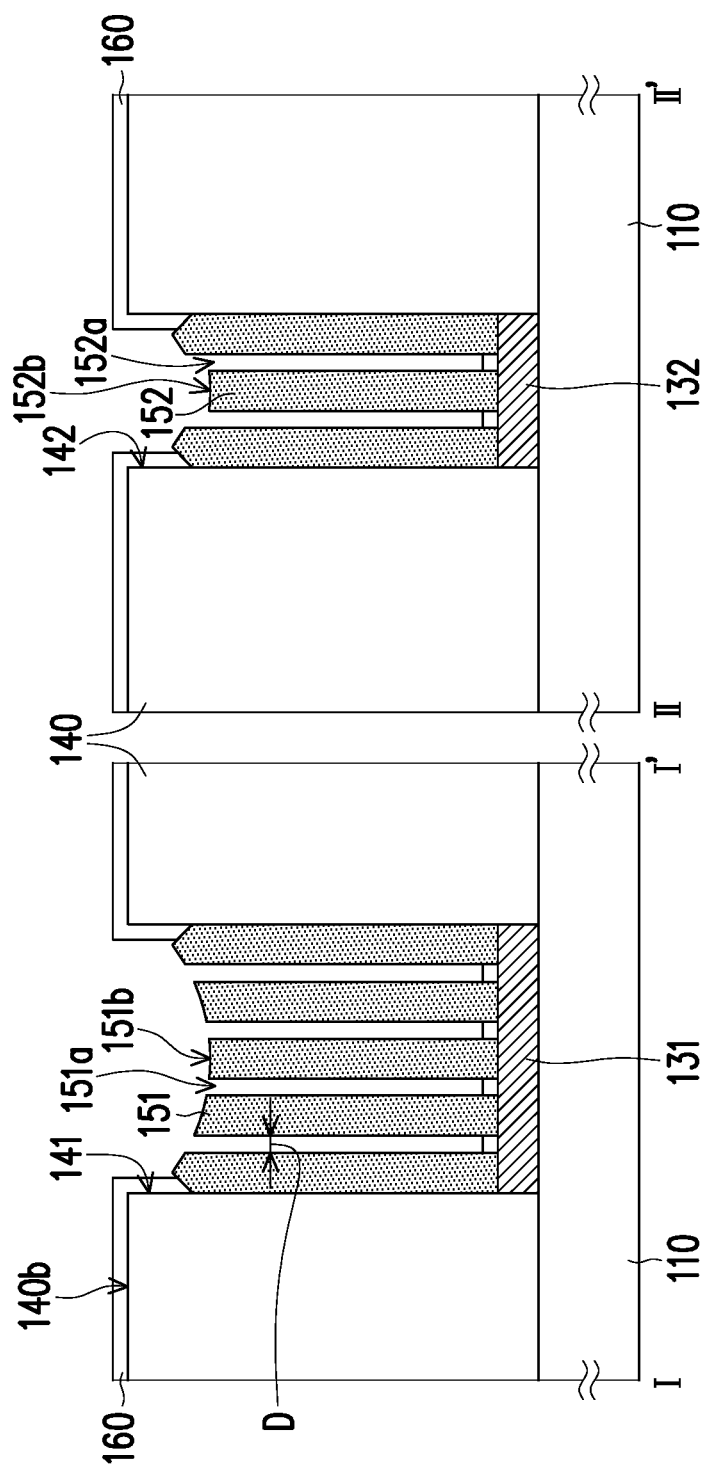

Referring to FIG. 1, FIG. 2 and FIG. 3C, next, an alignment film 160 is formed to cover the pixel array 120, the dielectric layer 140 and the filling patterns 151 and 152. The alignment film 160 is used to provide an anchoring force so that a plurality of liquid crystal molecules in a liquid crystal layer 300 has a specified pre-tile angle when the liquid crystal display 10 is not enabled.

For instance, in this embodiment, a spin coating method may be used to form the alignment film 160 on the dielectric layer 140 and the filling patterns 151 and 152, but the invention is not limited thereto.

It is worth noting that, in this embodiment, the alignment film 160 is formed only after the filling patterns 151 and 152 are filled within the openings 141 and 142 of the dielectric layer 140; by filling in with the filling patterns 151 and 152, an upper surface 140b of the dielectric layer 140 and top surfaces 151b and 152b of the filling patterns 151 and 152 can form a relatively even surface so that the striation defect is less likely to occur when the alignment film 160 is formed.

Figure 3D:
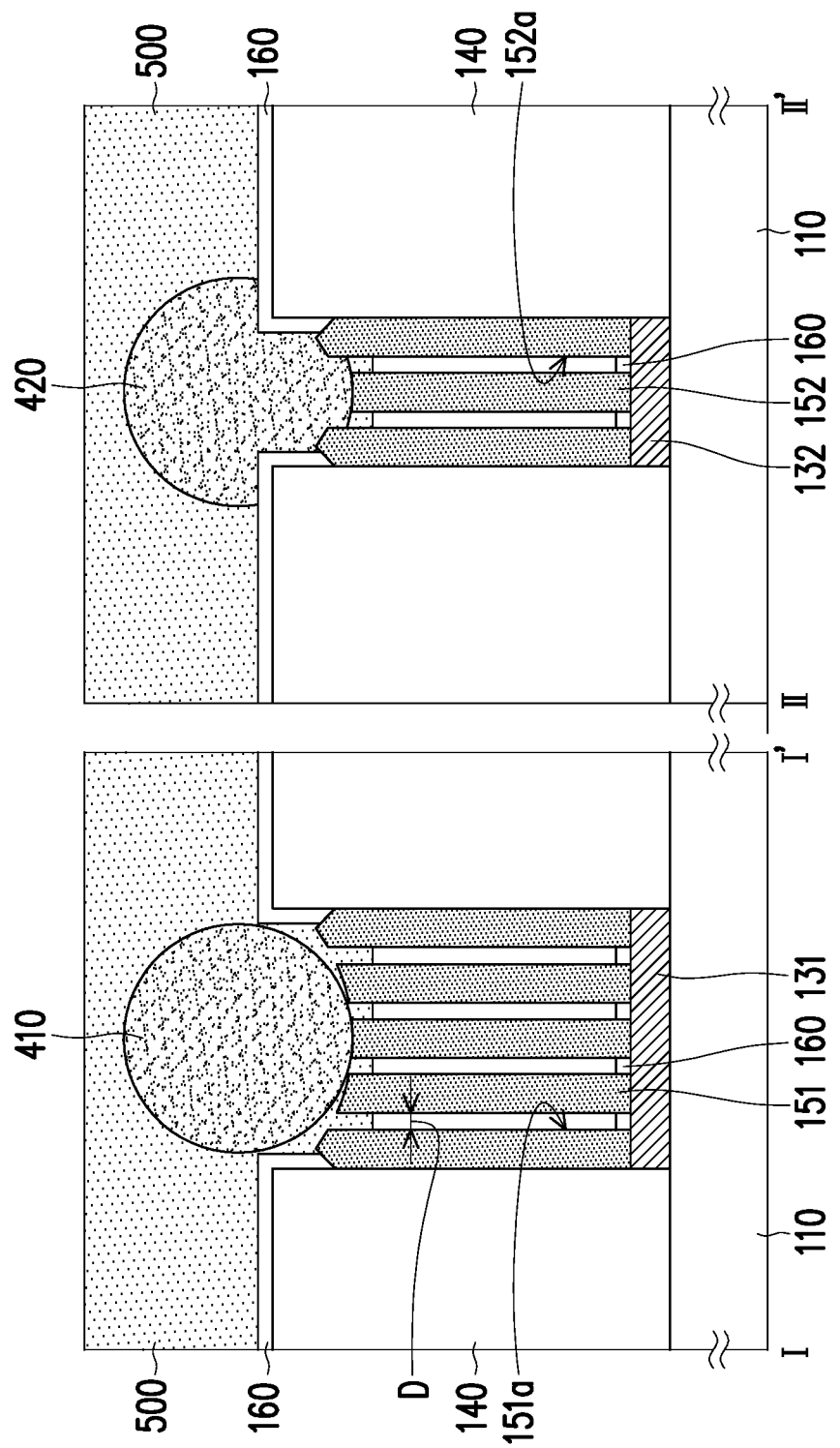

Referring to FIG. 1, FIG. 2 and FIG. 3D, next, a plurality of conductors 410 and 420 are formed on the pads 131 and 132. In this embodiment, the conductors 410 and 420 can be initially fixed above the first substrate 110 through a colloid 500. For instance, in this embodiment, the conductors 410 and 420 are, for example, Ni balls, and the colloid 500 is, for example, a sealant for encapsulating the liquid crystal layer 300, but the invention is not limited thereto.

Figure 3E:
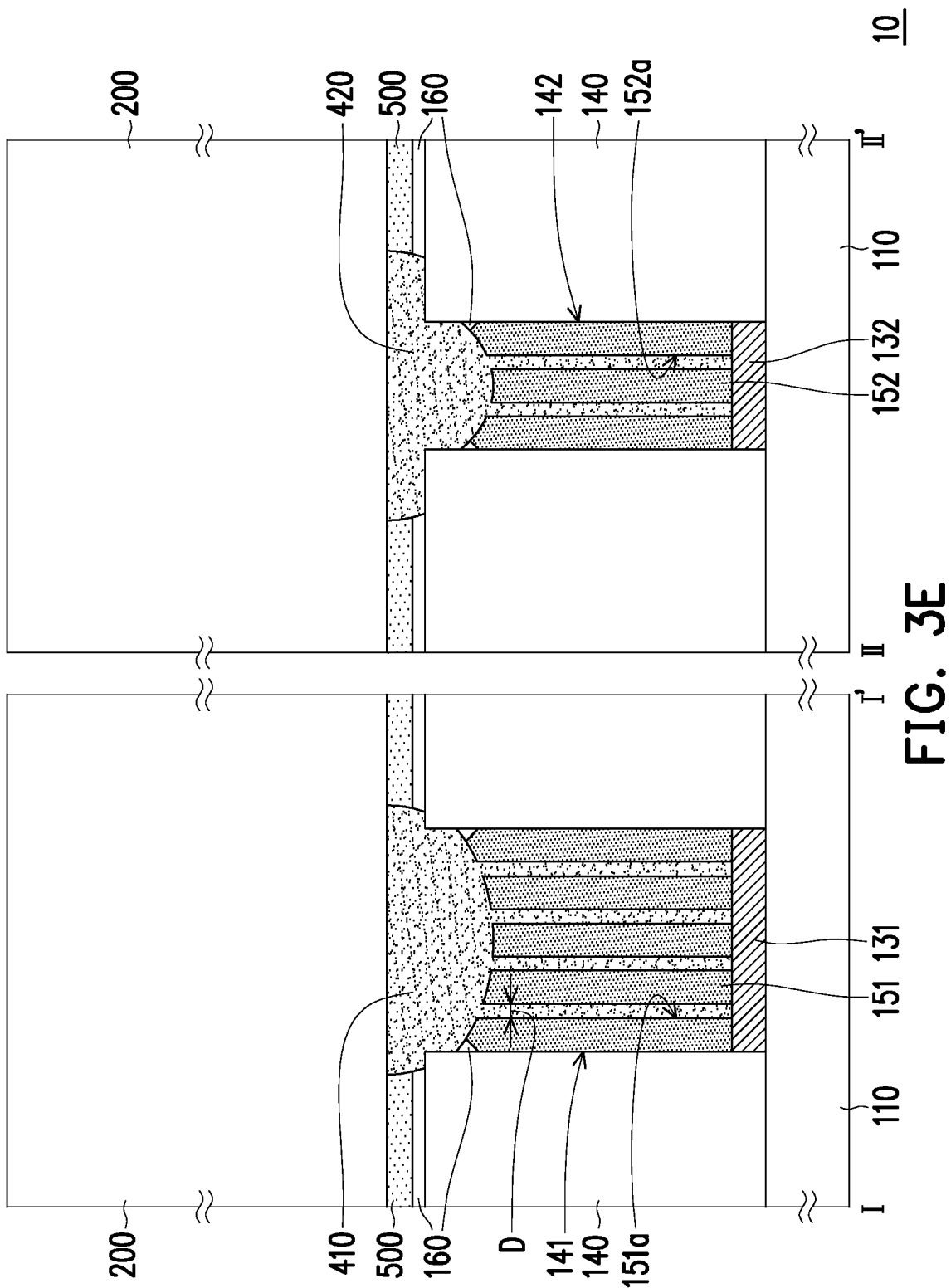

Referring to FIG. 1, FIG. 2 and FIG. 3E, next, the conductors 410 and 420 are electrically connected to the pads 131 and 132. For instance, in this embodiment, while the pixel array substrate 100 and a second substrate 200 are assembled, the second substrate 200 can press down the conductors 410 and 420 so that the conductors 410 and 420 are disposed in the openings 141 and 142 of the dielectric layer 140 and electrically connected to the pads 131 and 132 via the through holes 151a and 152a of the filling patterns 151 and 152.

It is worth noting that, because the filling patterns 151 and 152 have the through holes 151a and 152a, the conductors 410 and 420 can easily be electrically connected to the pads 131 and 132 via the filling patterns 151 and 152. In other words, while the filling pattern 151 and 152 are disposed within the openings 141 and 142 to prevent the striation defect from occurring, because the filling patterns 151 and 152 have the through holes 151a and 152a, the disposed filling patterns 151 and 152 cannot easily affect the electrical connection of the conductors 410 and 420 and the pads 131 and 132.

Further, in this embodiment, the conductors 410 and 420 are electrically connected to the pads 131 and 132 via the through holes 151a and 152a of the filling patterns 151 and 152 only after the alignment film 160 is formed. Therefore, a portion of the alignment film 160 may remain between the conductors 410 and 420 and the filling patterns 151 and 152, but the invention is not limited thereto.

The second substrate 200 is disposed opposite to the first substrate 110. For instance, in this embodiment, the second substrate 200 may include a glass substrate and a transparent conductive layer disposed on the glass substrate. A potential difference between the transparent conductive layer and the reflective electrode of the pixel array 120 may be used to drive the liquid crystal molecules in the liquid crystal layer 300 so the liquid crystal display 10 can display images. However, the invention is not limited in this regard. According to other embodiments, the second substrate 200 may also be other structures.

In this embodiment, the conductors 410 and 420 can be used to electrically connect the second substrate 200 with the pads 131 and 132. That is to say, in this embodiment, the pads 131 and 132 disposed on the first substrate 110 can be electrically connected to the second substrate 200 via the conductors 410 and 420, but the invention is not limited thereto.

Referring to FIG. 1, FIG. 2 and FIG. 3E, next, in this embodiment, a vacuum Impregnation may be optionally used to fill the liquid crystal layer 300 in a space surrounded by the pixel array substrate 100, the second substrate 200 and the colloid 500. Then, a liquid crystal injection port (not shown) of the colloid 500 is sealed. At this point, the liquid crystal display 10 of the present embodiment is completed.

Because the filling patterns 151 and 152 are disposed within the openings 141 and 142 of the dielectric layer 140 of the pixel array substrate 100, the liquid crystal display 10 is less likely to have the striation defect. More importantly, because the filling patterns 151 and 152 have the through holes 151a and 152b, the conductors 410 and 420 can be electrically connected to the pads 131 and 132 well in the manufacturing process of the liquid crystal display 10 so that the liquid crystal display 10 has normal function and excellent reliability.

In this embodiment, the filling patterns 151 and 152 are provided within the openings 141 and 142 of the dielectric layer 140, respectively. However, the invention is not limited in this regard. According to other embodiments, if the opening of a portion of the dielectric layer 140 (e.g., the opening 142) is not large and the opening of the portion of the dielectric layer 140 is less likely to cause the streaking defect, it is also possible that the filling pattern (e.g., the filling pattern 152) is not provided within the opening of the portion of the dielectric layer 140. Details regarding the above will be described below with reference to FIG. 4, FIG. 5 and FIG. 6.

It should be noted that the reference numerals and a part of the contents in the previous embodiment are used in the following embodiments, in which identical reference numerals indicate identical or similar components, and repeated description of the same technical contents is omitted. The omitted part of the description can refer to the foregoing embodiment, which is not repeated in the following embodiments.

Figure 4:
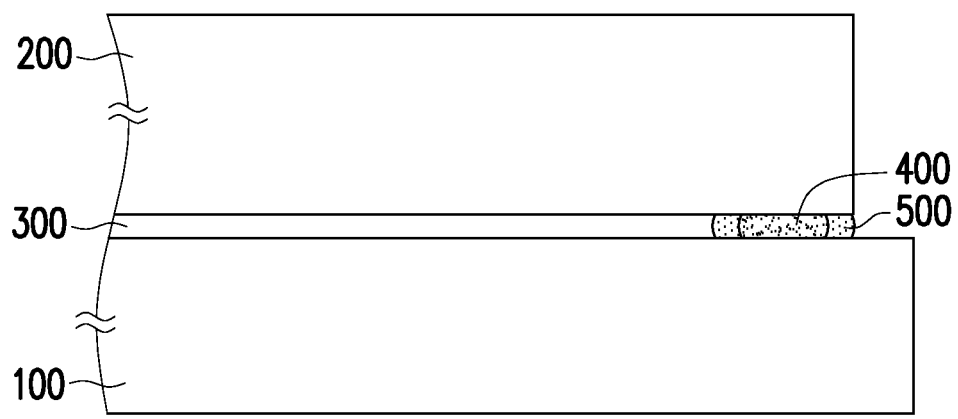
FIG. 4 is a cross-sectional view of a liquid crystal display 10A in another embodiment of the invention.

FIG. 4 is a cross-sectional view of the liquid crystal display 10A in another embodiment of the invention.

Figure 5:
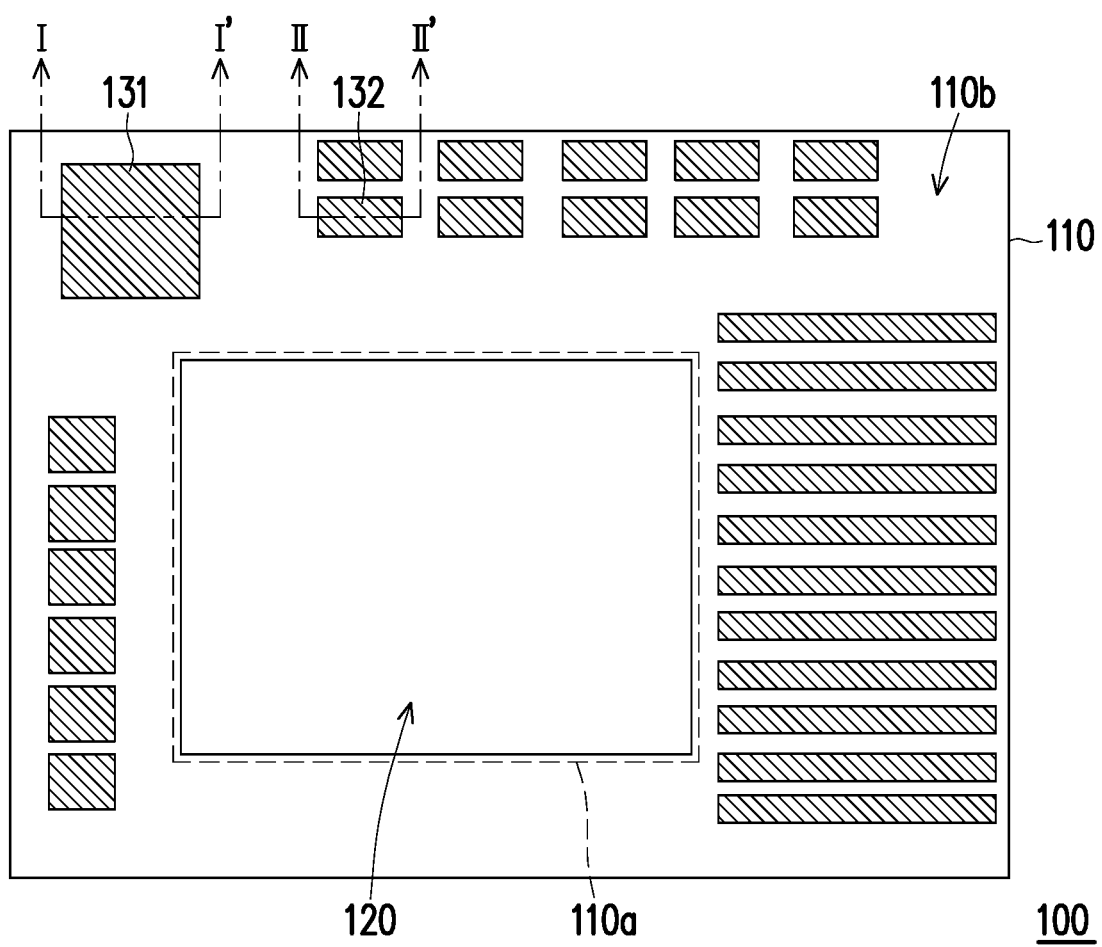
FIG. 5 is a top view of a pixel array substrate 100A of FIG. 4.

FIG. 5 is a top view of the pixel array substrate 100A of FIG. 4.

Figure 6:
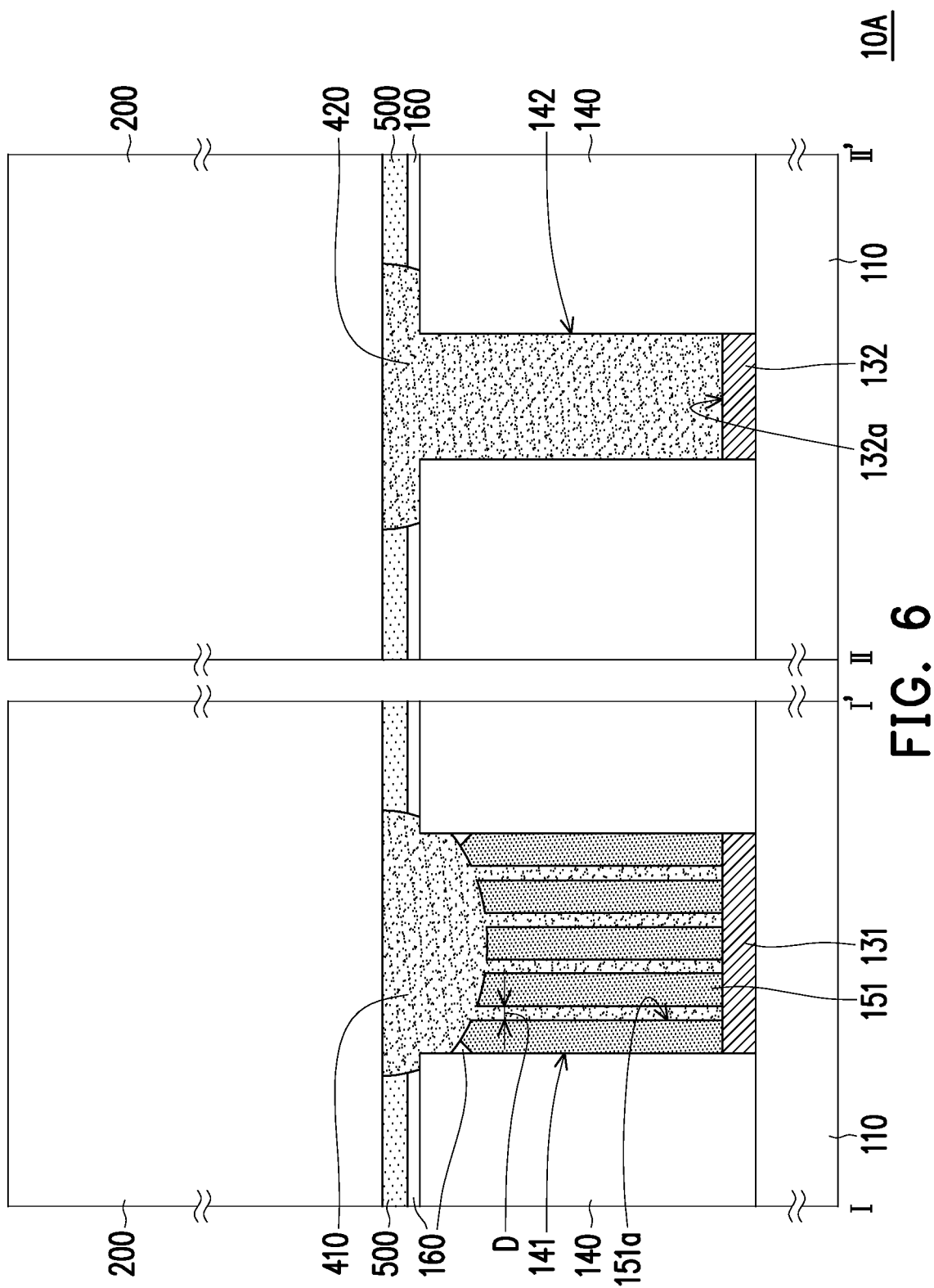
FIG. 6 is a cross-sectional view of the liquid crystal display 10A corresponding to a section line I-I' and a section line II-II' of FIG. 5.

FIG. 6 is a cross-sectional view of the liquid crystal display 10A corresponding to a section line I-I' and a section line II-II' of FIG. 5.

Referring to FIG. 4, FIG. 5 and FIG. 6, the liquid crystal display 10A of the present embodiment is similar to the liquid crystal display 10 described above, and the difference between the two is that, in this embodiment, the filling pattern 151 is disposed within the opening (e.g., the opening 141) of a portion of the dielectric layer 140, and it is possible that the filling pattern is not disposed within the opening (e.g., the opening 142) of another portion of the dielectric layer 140.

Specifically, in this embodiment, the pads 131 and 132 of the pixel array substrate 100A include the pad 131 having a larger area and the pad 132 having a smaller area. The opening 141 of the dielectric layer 140 overlapped with the pad 131 having the larger area is larger, and the opening 142 of the dielectric layer 140 overlapped with the pad 132 having the smaller area is smaller. It is possible that the filling pattern is not disposed within the smaller opening 142. That is to say, in this embodiment, the pad 132 has a surface 132a overlapped with the opening 142, and the conductor 420 can directly contact and completely cover the surface 132a of the pad 132.

Figure 7:
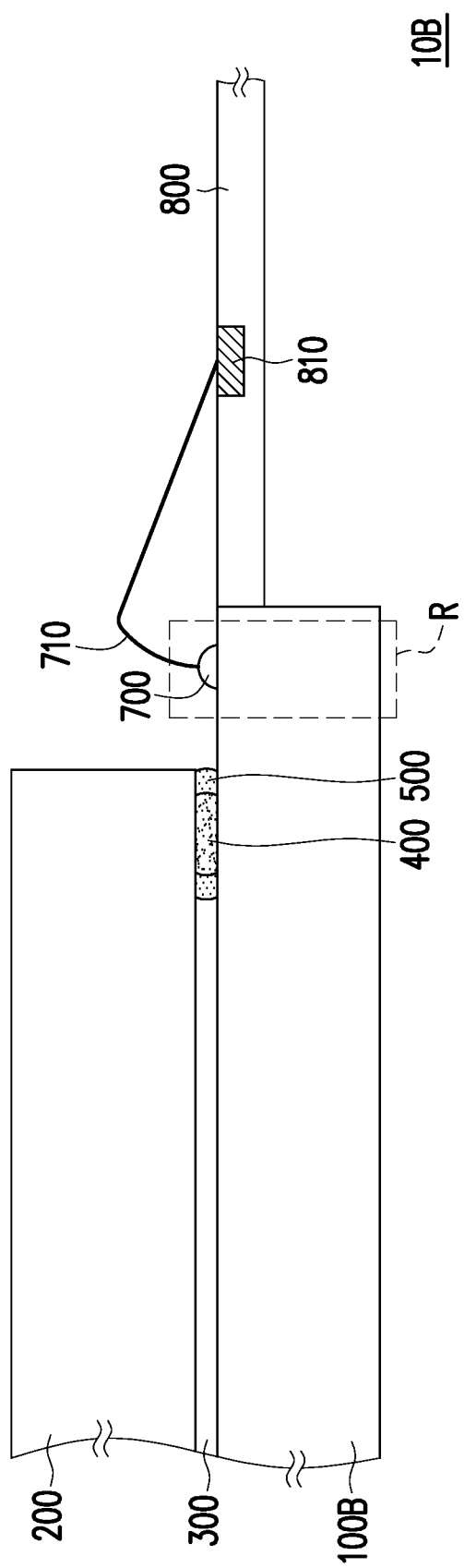
FIG. 7 is a cross-sectional view of a liquid crystal display 10B in yet another embodiment of the invention.
Figure 8:
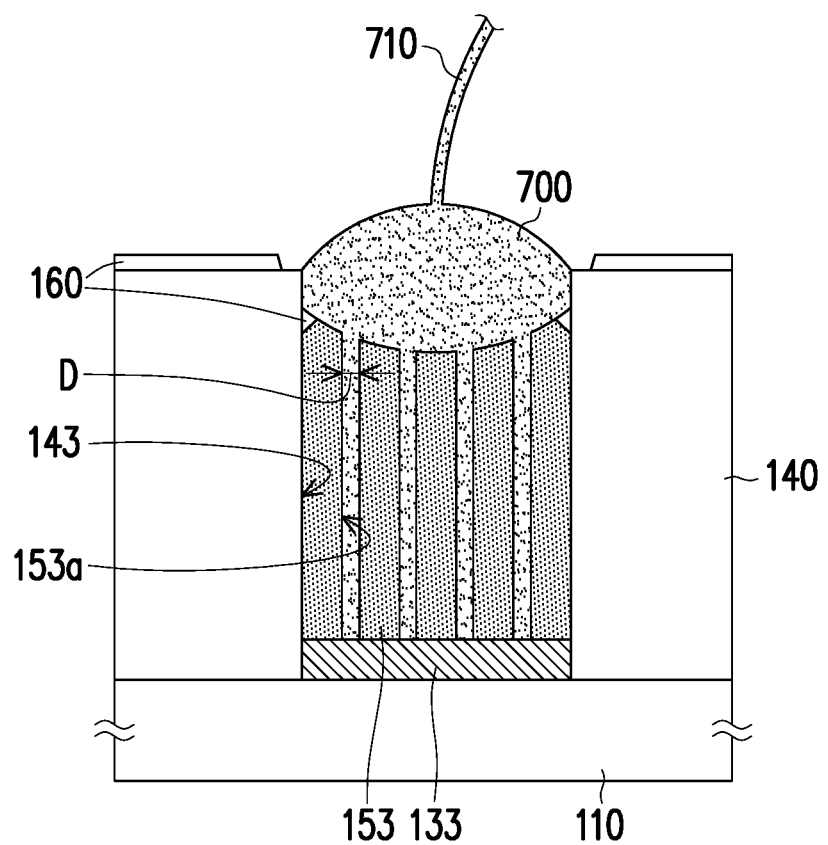
FIG. 8 is an enlarged schematic diagram of a local portion R of the liquid crystal display 10B of FIG. 7.

FIG. 7 is a cross-sectional view of the liquid crystal display 10B in yet another embodiment of the invention. FIG. 8 is an enlarged schematic diagram of the local portion R of the liquid crystal display 10B of FIG. 7.

Referring to FIG. 7 and FIG. 8, the liquid crystal display 10B of the present embodiment is similar to the liquid crystal display 10 described above, and the difference between the two is described as follows.

In this embodiment, a pixel array substrate 100B further includes a pad 133 for use in a wire bonding. The dielectric layer 140 further includes an opening 143 overlapped with the pad 133. The liquid crystal display 10B further includes a filling pattern 153 disposed within the opening 143 of the dielectric layer 140. The filling pattern 153 has a plurality of through holes 153a, and the through holes 153a of the filling pattern 153 are overlapped with the pad 133. The liquid crystal display 10B further includes a conductor 700, which is disposed in the opening 143 of the dielectric layer 140 and electrically connected to the pad 133 via the through holes 153a of the filling pattern 153. The liquid crystal display 10B further includes a solder wire 710, which is disposed on the conductor 700 and electrically connected to the conductor 700. The liquid crystal display 10B further includes a circuit board 800. A circuit contact 810 of the circuit boards 800 can be electrically connected to the pad 133 via the solder wire 710 and the conductor 700. For instance, in this embodiment, the circuit board 800 may be a flexible printed circuit (FPC), but the invention is not limited thereto.

In this embodiment, during the wire bonding, a conductive ball (i.e., the conductor 700) can be electrically connected to the pad 133 well via the through holes 153a of the filling pattern 153 so that the liquid crystal display 10B has normal function and excellent reliability.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A liquid crystal display, comprising:
   a first substrate, having a display area and a pad area located outside the display area;
   a pixel array, disposed on the display area of the first substrate;
   a first pad, disposed on the pad area of the first substrate;
   a dielectric layer, disposed on the pad area of the first substrate, and having a first opening, wherein the first opening of the dielectric layer is overlapped with the first pad;
   a filling pattern, disposed within the first opening of the dielectric layer, wherein the filling pattern has a plurality of through holes, and the through holes of the filling pattern are overlapped with the first pads;
   a first conductor, disposed in the first opening of the dielectric layer, and electrically connected to the first pad via the through holes of the filling pattern, wherein the dielectric layer has an upper surface facing away from the first substrate, the first conductor is disposed on the upper surface of the dielectric layer, the first conductor is filled in the plurality of through holes of the filling pattern, and the first conductor is integrally formed;
   a second substrate, disposed opposite to the first substrate;
   a liquid crystal layer, disposed between the pixel array and the second substrate; and
   an alignment film, located between the first conductor and the filling pattern, wherein the alignment film is directly contacted with the first conductor and the filling pattern.

2. The liquid crystal display according to claim 1, wherein a material of the filling pattern comprises a photoresist.

3. The liquid crystal display according to claim 1, wherein the first pad is electrically connected to the second substrate via the first conductor.

4. The liquid crystal display according to claim 1, further comprising:
   a solder wire, disposed on the first conductor and electrically connected to the first conductor; and
   a circuit board, electrically connected to the first pad via the solder wire and the first conductor.

5. The liquid crystal display according to claim 1, wherein one of the through holes of the filling pattern has an aperture D, and 0.3 µm≤D≤10 µm.

6. The liquid crystal display according to claim 1, wherein the first substrate is a silicon substrate.

7. The liquid crystal display according to claim 1, wherein a material of the first conductor comprises Ni.

8. The liquid crystal display according to claim 1, wherein the dielectric layer further comprises a second opening spaced apart from the first opening, and the liquid crystal display further comprises:
- a second pad, disposed on the pad area of the first substrate, and spaced apart from the first pad, wherein the second opening of the dielectric layer is overlapped with the second pad; and
- a second conductor, disposed in the second opening of the dielectric layer, wherein the second pad has a surface overlapped with the second opening of the dielectric layer, and the second conductor directly contacts and completely covers the surface of the second pad.

9. The liquid crystal display according to claim 8, wherein an area of the second pad is smaller than an area of the first pad.

* * * * *